United States Patent
Hosenpud et al.

(10) Patent No.: US 10,321,126 B2
(45) Date of Patent: Jun. 11, 2019

(54) USER INPUT DEVICE CAMERA

(71) Applicant: zSpace, Inc., Sunnyvale, CA (US)

(72) Inventors: Jonathan J. Hosenpud, San Francisco, CA (US); Arthur L. Berman, San Jose, CA (US); Jerome C. Tu, Saratoga, CA (US); Kevin D. Morishige, Los Altos Hills, CA (US); David A. Chavez, San Jose, CA (US)

(73) Assignee: zSpace, Inc., Sunnycale, CA (US)

( * ) Notice: Subject to any disclaimer, the term of this patent is extended or adjusted under 35 U.S.C. 154(b) by 0 days.

(21) Appl. No.: 14/792,844

(22) Filed: Jul. 7, 2015

(65) Prior Publication Data

US 2016/0014391 A1 Jan. 14, 2016

Related U.S. Application Data

(60) Provisional application No. 62/022,014, filed on Jul. 8, 2014.

(51) Int. Cl.
*H04N 13/398* (2018.01)
*H04N 13/337* (2018.01)
*H04N 13/334* (2018.01)
*H04N 13/366* (2018.01)

(52) U.S. Cl.
CPC ......... *H04N 13/398* (2018.05); *H04N 13/334* (2018.05); *H04N 13/337* (2018.05); *H04N 13/366* (2018.05)

(58) Field of Classification Search
USPC .................................................. 345/419, 427
See application file for complete search history.

(56) References Cited

U.S. PATENT DOCUMENTS

| 6,690,338 | B1 | 2/2004 | Maguire | |
|---|---|---|---|---|
| 7,094,153 | B2 | 8/2006 | Kunieda | |
| 8,218,002 | B2 | 7/2012 | Maguire | |
| 8,780,180 | B2 * | 7/2014 | Parulski | H04N 13/0221 348/46 |
| 8,866,809 | B2 * | 10/2014 | McCarthy | G06T 15/20 345/419 |
| 2006/0244745 | A1 * | 11/2006 | Majer | G06F 3/04815 345/419 |
| 2008/0309660 | A1 * | 12/2008 | Bertolami | A63F 13/10 345/419 |
| 2010/0045773 | A1 * | 2/2010 | Ritchey | G02B 13/06 348/36 |
| 2011/0214072 | A1 | 9/2011 | Lindemann | |

(Continued)

*Primary Examiner* — Kimbinh T Nguyen
(74) *Attorney, Agent, or Firm* — Myertons Hood Kivlin Kowert and Goetzel PC; Jeffrey C. Hood; Brian E. Moore

(57) ABSTRACT

Systems and methods for capturing a two dimensional (2D) image of a portion of a three dimensional (3D) scene may include a computer rendering a 3D scene on a display from a user's point of view (POV). A camera mode may be activated in response to user input and a POV of a camera may be determined. The POV of the camera may be specified by position and orientation of a user input device coupled to the computer, and may be independent of the user's POV. A 2D frame of the 3D scene based on the POV of the camera may be determined and the 2D image based on the 2D frame may be captured in response to user input. The 2D image may be stored locally or on a server of a network.

20 Claims, 5 Drawing Sheets

(56) References Cited

U.S. PATENT DOCUMENTS

| | | | | |
|---|---|---|---|---|
| 2013/0187910 | A1* | 7/2013 | Raymond | G09G 5/14 |
| | | | | 345/419 |
| 2014/0002351 | A1* | 1/2014 | Nakayama | G06F 3/012 |
| | | | | 345/156 |
| 2014/0043445 | A1* | 2/2014 | Zhang | H04N 13/0242 |
| | | | | 348/48 |
| 2014/0098186 | A1* | 4/2014 | Seidl | G06T 15/10 |
| | | | | 348/36 |
| 2014/0306963 | A1* | 10/2014 | Sun | H04N 13/0402 |
| | | | | 345/427 |
| 2015/0130801 | A1* | 5/2015 | Wooley | H04N 5/232 |
| | | | | 345/420 |
| 2015/0138065 | A1* | 5/2015 | Alfieri | G06F 3/017 |
| | | | | 345/156 |
| 2015/0358539 | A1* | 12/2015 | Catt | G06T 5/006 |
| | | | | 348/38 |

* cited by examiner

USER INPUT DEVICE CAMERA

PRIORITY DATA

This application claims benefit of priority to U.S. Provisional Application Ser. No. 62/022,014, filed Jul. 8, 2014, titled "User Input Device Camera" whose inventors are Jonathan J. Hosenpud, Arthur L. Berman, Jerome C. Tu, and Kevin D. Morishige, which is hereby incorporated by reference in its entirety as though fully and completely set forth herein.

TECHNICAL FIELD

This disclosure relates to the field of digital display, and more particularly to methods and systems to view and capture still and video images from a perspective related to the tip of a user input device. The user input device is used in connection with a stereoscopic display system.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system, specifically, between the display panel and the viewer, as shown in FIG. 2. The purpose of the PS is to switch the light transmitted from the display panel between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in prior art FIG. 3. As may be seen, the top portion of the figure shows the (display) panel switching between a left image and a right image. Synchronous with the panel switching, the PS is switching between a Left State and a Right State, as shown. These two states emit two corresponding orthogonal polarization states, as mentioned above. As FIG. 3 further shows, the system includes stereo eyewear that is designed such that the left lens will only pass the Left State polarization and the right lens will only pass the Right State polarization. In this way, separation of the right and left images is achieved.

The second conventional architecture uses stereo shutter glasses, which replace (or integrate the functionality of) the PS and eyewear. In such systems, each eye is covered by an optical shutter, which can be either open or closed. Each of these shutters is opened and closed synchronously with the display panel in such a way that when the left image is shown on the display, only the left eye shutter is open, and when the right image is shown on the display, only the right eye shutter is open. In this manner, the left and right views are (alternatingly) presented to the user's left and right eyes, respectively.

Thus, given a three dimensional scene on one of the above displays, it may be desirable for a user to similarly explore a stereoscopic virtual space in order to understand the full content of the virtual space and the relationships between the objects within the virtual space just as it may be desirable for the user to explore a real space.

One way a user may interact with and control objects in the virtual space is via a user input device, such as a stylus. However, currently there are limited ways to record or preserve the user's interactions with and control of the objects in the virtual space via the user input device. Thus, systems and methods to record video and still images from a perspective related to the tip of the stylus are desirable.

SUMMARY

Various embodiments of systems and methods for capturing a two dimensional (2D) image of a portion of a three dimensional (3D) scene are disclosed. The method may be performed by a computer or may be stored as programming instructions executable by a processor. The processor and/or computer may be included in a system that also includes one or more displays and one or more one user input devices.

In one embodiment, a 3D scene may be rendered on a display from a user's point of view (POV) and a camera mode may be activated in response to user input. Further, a POV of a camera may be determined. The POV of the camera may be specified by position and orientation of a user input device coupled to a computer (processor) of a 3D display system. In some embodiments, the POV of the camera may be independent of the user's POV.

A 2D frame of the 3D scene based on the POV of the camera may be determined and the 2D image based on the 2D frame may be captured in response to user input. The 2D image may be the first image in a sequence of images captured. The 2D image, or sequence of 2D images, may be stored.

BRIEF DESCRIPTION OF THE DRAWINGS

A better understanding of the present disclosure can be obtained when the following detailed description of the preferred embodiment is considered in conjunction with the following drawings, in which.

Figure 1:
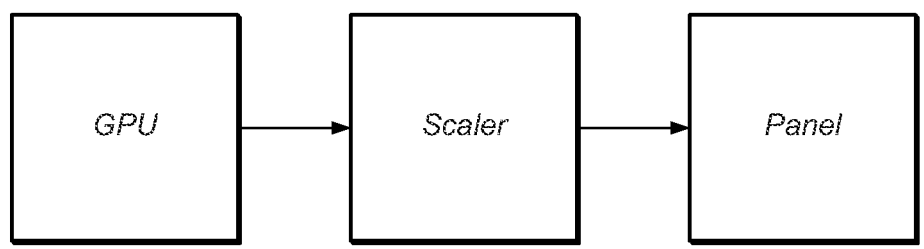
FIG. 1 illustrates a modern display chain, according to the prior art.
Figure 2:
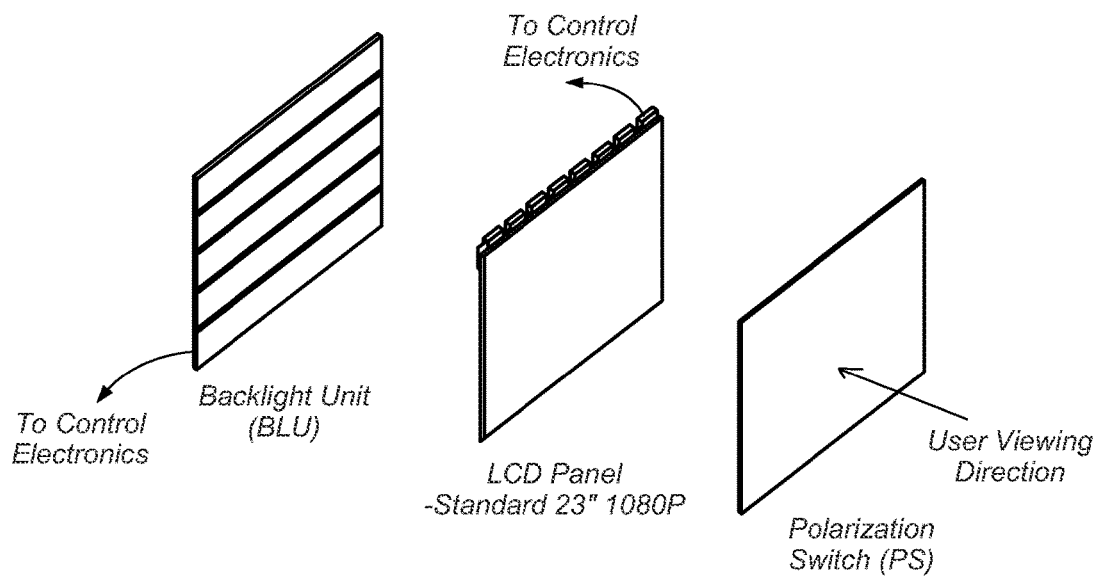
FIG. 2 illustrates an architecture that utilizes a polarization switch, according to the prior art.
Figure 3:
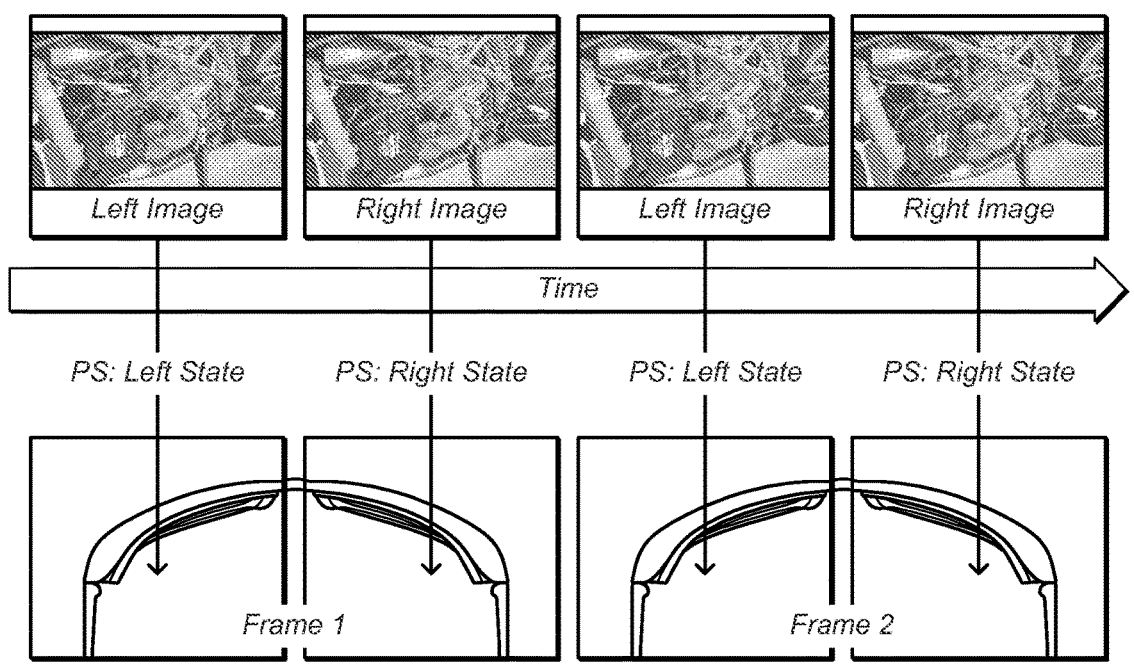
FIG. 3 illustrates a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment."

The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 4:
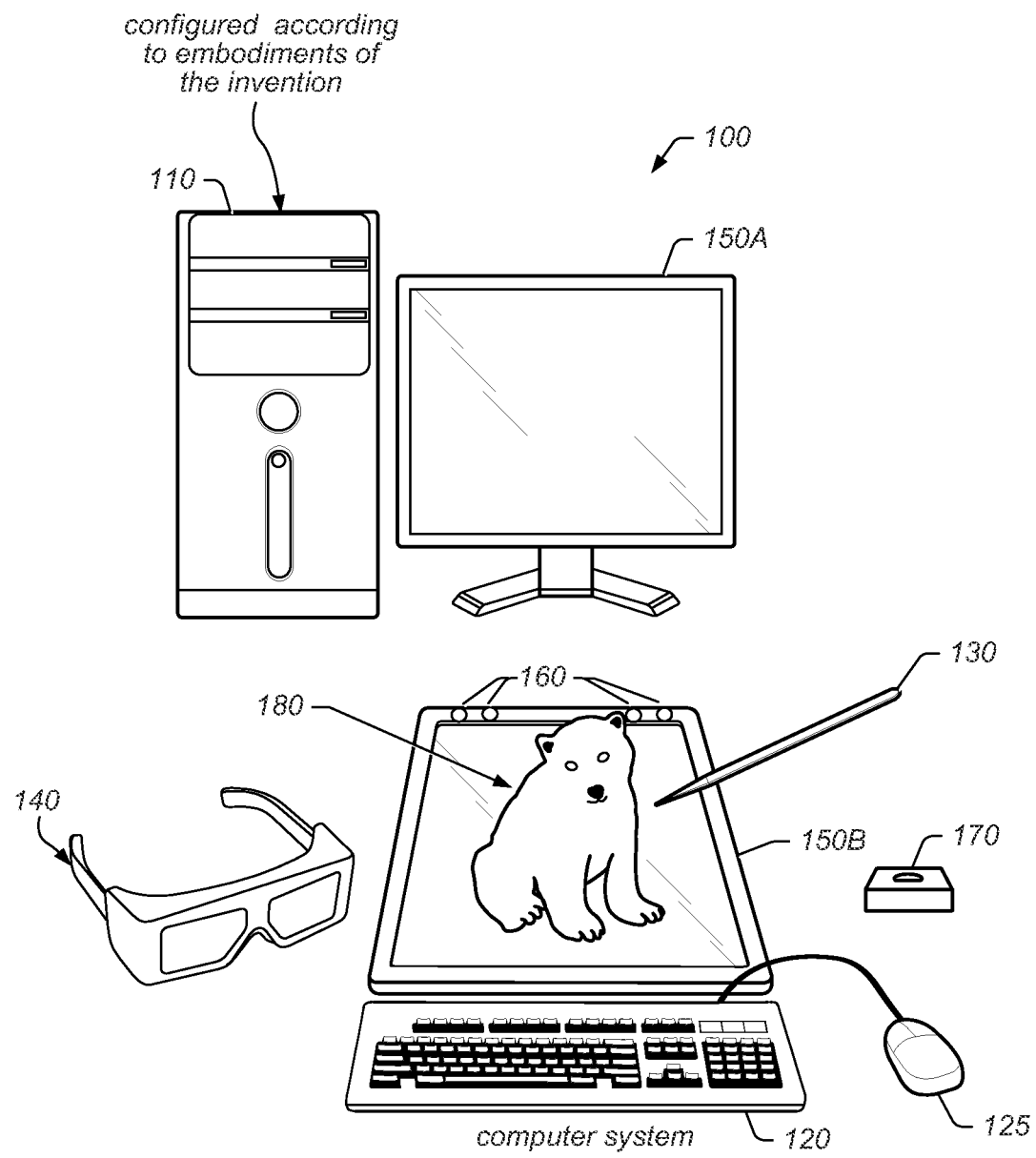
FIG. 4 illustrates a 3D stereoscopic display configured according to embodiments of the invention.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface. More particularly, the term "horizontal perspective" may typically refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in this invention is the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define camera point of the frustum in relation to the render plane. The resultant projection is then rendered onto the viewing device as will be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—a peripheral device or element such as a handheld device, handheld pen device, handheld pointing device, hand, finger, glove, or any object used to directly interact with rendered virtual objects as in a stereo rendered virtual projected objects.

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

FIG. 4—Exemplary System

FIG. 4 illustrates an exemplary system that may be configured to implement various embodiments of the techniques described below.

In the exemplary embodiment of FIG. 4, computer system 100 may include chassis 110, display 150A and display 150B (which may collectively be referred to as display 150 or "at least one display" 150), keyboard 120, mouse 125, user input device 130, eyewear 140, at least two cameras 160, and caddy 170. Note that in some embodiments, two displays 150A and 150B may not be used; instead, for example, a single display 150 may be used in such embodiments. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium may also store data (and/or program instructions) (e.g., implementing or specifying a computer model) representing a virtual space, which may be used for projecting a 3D scene, such as scene 180, of the virtual space via the display(s) 150. Further, one or more memory mediums may store software which is executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 4 is exemplary only, and other numbers of displays are also envisioned. For example, the computer system 100 may include only a single display or more than two displays, or the displays may be arranged in different manners than shown, e.g., as goggles or other wearable eyewear or headgear. In this particular embodiment, the display 150A is configured as a vertical display (which is perpendicular to a user's line of sight) and the display 150B is configured as a horizontal display (which may be parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, in other embodiments, they may be any type of system which is capable of displaying images, e.g., projection systems. For example, display(s) 150 may be or include, for example, a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D since the actual provided images are 2D, but the scene is conveyed in 3D via the user's interpretation of the provided images. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiments, the position input device may use a light sensitive detection system, e.g., may include an infrared detection system to detect the position of the viewer's head to allow the viewer freedom of head movement. Other embodiments of the input device(s) may use the triangulation method of detecting the viewer point of view location, such as one or more sensors (e.g., two cameras, such as CCD or CMOS cameras) providing position and/or orientation data suitable for the head tracking. The input device(s) may be manually operated by the viewer, such as a keyboard, mouse, trackball, joystick, or the like, or combinations thereof, to indicate the correct display of the horizontal perspective display images. However, any method for tracking the position of the user's head or point of view may be used as desired. Accordingly, the 3D scene may be rendered from the perspective (or point of view) of the user such that user may view the 3D scene with minimal distortions (e.g., since it is based on the point of view of the user). Thus, the 3D scene may be particularly rendered for the point of view of the user, using the position input device.

The relationships among the position/orientation of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. In some embodiments, at least a portion of the 3D scene may be presented in this "open space", which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is not in "open space". Thus, "open space" refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, "open space" may be considered to be a "hands-on volume" as opposed to an "inner-volume", which may be under the surface of the display(s), and thus not accessible. Thus, the user may interact with virtual objects in the open space because they are proximate to the user's own physical space. Said another way, the inner volume is located behind (or under) the viewing surface, and so presented objects appear to be located inside (or on the back side of) the physical viewing device. Thus, objects of the 3D scene presented within the inner volume do not share the same physical space with the user and the objects therefore cannot be directly and physically manipulated by hands or hand-held tools such as user input device 130. Rather, they may be manipulated indirectly, e.g., via a computer mouse, a joystick, or virtual representations of hands, handheld tools, or a stylus.

In some embodiments, system 100 may include one or more sensors 160. The one or more sensors 160 may be included in a point of view (POV) tracking system. FIG. 4 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Sensors 160 may be used to image a user of system 100, track a user's movement, or track a user's head or eyes, among other contemplated functions. In one embodiment, cameras 160 may track a position and/or an orientation of user input device 130. The information regarding the position and/or orientation of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user input device 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs on a processor or functional unit of chassis 110, although in other embodiments the POV tracking system may operate independently, e.g., may have its own processor or functional unit.

In certain embodiments, the system may include components implementing a perspective based image capture system, for capturing images of target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit to ensure proper mapping of the peripheral device to the display images and proper mapping between the projected images and the virtual images stored in the memory of the chassis 110.

Thus, the system 100 may present a 3D scene which the user may interact with in real time. The system may comprise real-time electronic display(s) 150 that may present or convey perspective images in the open space, and a peripheral device 130 that may allow the user to interact with the 3D scene with hand controlled or hand-held tools. The system 100 may also include means to manipulate the displayed image such as magnification, zoom, rotation, movement, and even display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground, other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 5:
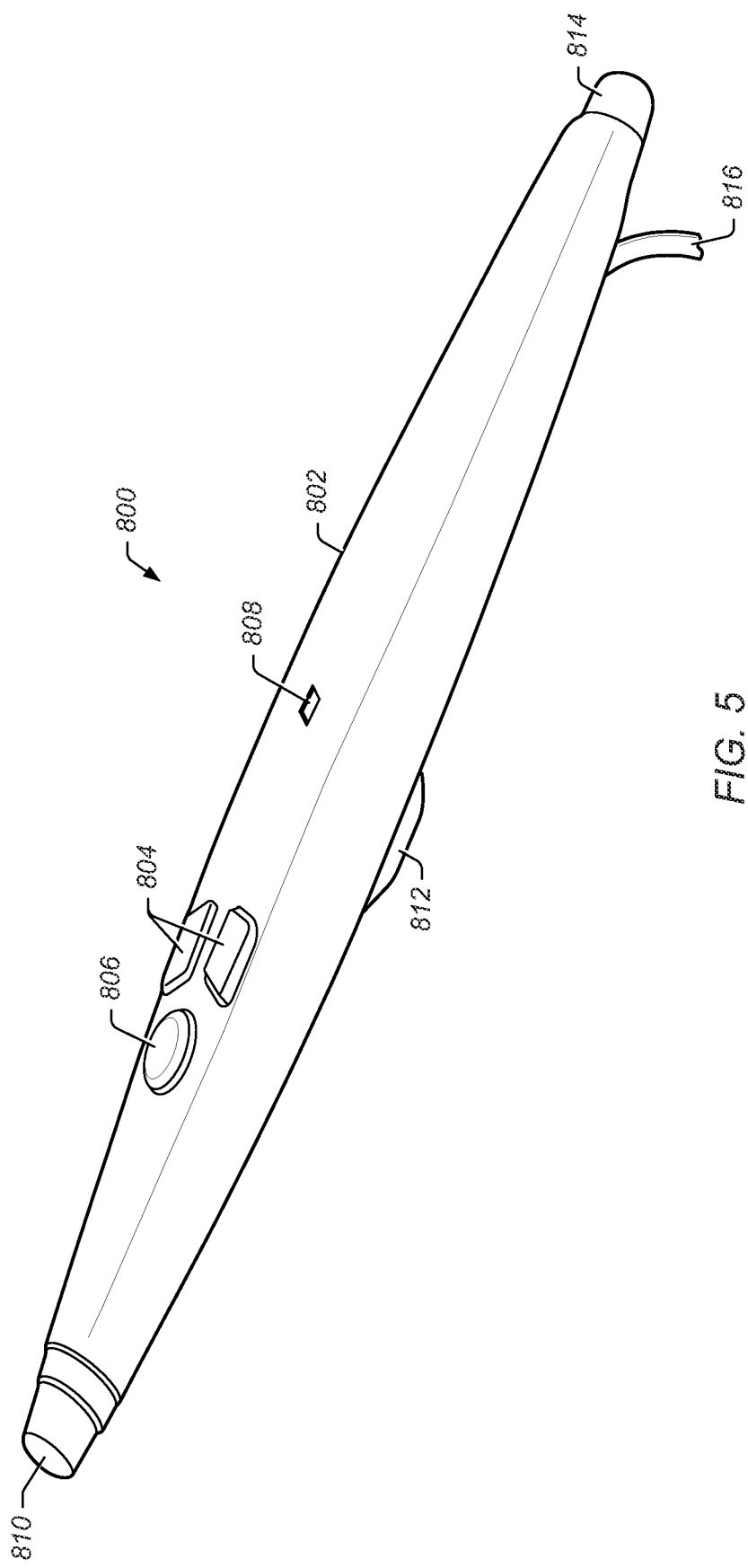
FIG. 5 illustrates an exemplary user input device configured according to embodiments of the invention.

FIG. 5—Exemplary User Input Device

FIG. 5 illustrates an exemplary user input device 800 configured according to embodiments of the invention. User input device 800 may be similar to or the same as user input device 130 described above in reference to FIG. 4. Thus, user input device 800 may be used in conjunction with, or be included in, system 100. As described above, system 100 may have the capability to determine the six axis position and orientation of user input device 800. Note that this includes the X, Y, Z location of tip 810 of user input device 800 and the $\alpha$, $\beta$, $\gamma$ angular orientation of body 802 of user input device 800. However, it should be further noted that user input device 800 is exemplary, and that other user input devices, suitably configured, may be used as desired.

As shown, user input device 800 may include buttons 804, 806, and 812. One of the buttons, such as button 806, may be depressed and held down to trigger the selection of an object within the 3D scene presented by system 100. Additionally, system 100 may be configured to display a virtual "laser like" projection from tip 810 to the selected object. With the object selected, adjustment of the position and/or orientation of user input device 800 may change the position and/or orientation of the object. Thus, movements of the user input device 800 may result in corresponding translations and/or rotations of the object.

The physical position and/or orientation of the user input device 800 with respect to the display of a 3D stereoscopic display system, such as system 100, may define or specify a 2D image to be captured. In other words, the viewpoint of user input device 800, as defined by its physical position and/or orientation, may define or specify a 2D region of interest within a virtual 3D scene displayed by a 3D stereoscopic display system. Further, the image may be captured by pressing a designated button, such as one of buttons 804, 806, or 814, on user input device 800. In certain embodiments the image may be presented in a frame, and the user may add either visible text or metadata to the frame.

A camera mode of the 3D stereoscopic display system may be activated by pressing one of the buttons 804, 806, or 814 of user input device 800. The camera mode may be implemented as software or a combination of software and hardware. The camera mode may utilize various systems within the 3D stereoscopic display system. Once the camera mode is activated, the button designated (configured) by the system to activate the camera mode may be available for other assignment, e.g., possibly a camera related function. Alternatively, or in addition to, other user input, such as a key stroke or a menu selection may activate the camera mode.

In camera mode, the user input device 800 may be used to specify a 2D frame. The 2D frame may be fixed to a position somewhere on the display screen and the position may be controlled and/or moved by the user. Alternately, the position of the 2D frame may be associated with the user input device, including the 2D frame being in line with an axis of the user input device or being off to the side of the user input device. In both cases, the 2D frame may have movements within the 3D scene corresponding to changes in the position and/or orientation of the user input device. The 2D frame may specify the image to be captured.

Further, the user may select an aspect ratio of the image to be captured, such as a 4:3 or a 16:9 aspect ratio, among others. Alternatively, or in addition to, the user may designate the aspect ratio. Additionally, the user input device may be used to define the shape and size of the image to be captured.

Additionally, multiple images or "photos" may be taken and may be stored, or "collected" in a memory, or "stack." The memory may correspond to a user interface "container" accessible within the 3D scene. The images may be transferred to a designated location and an animation may be associated with the transfer, e.g., an animation of items moving from an initial location to the designated location. In some embodiments, the multiple images may appear as a film strip or as thumbnails, and clicking on an image may expand the image to full size for viewing. The captured images may have metadata such as a time stamp or 6-axis position/orientation data automatically associated with each image.

In one embodiment, additional buttons on the user input device may be assigned functions related to the camera mode. For example, one button may zoom the image in while another button may zoom the image out. Additionally, or alternatively, these functions may be resident at a location on another input device associated with the system, such as on a scroll wheel on a mouse, a keyboard, a track ball, or a touch pad, among other user input devices. The functions may also be controlled from a user input device that may include a multi-axis button, such as a joy stick or a dial button.

In some embodiments, the position of the POV used to select/capture images while in camera mode may be in a location not currently visible to the user. For example, consider a location at the end of a tunnel rendered in the 3D scene, but not currently visible to the user; an image may be taken at this location with the associated 6-axis coordinates. Then, by selecting the image, the user may be "transported" to this location. As another example, the user input device may be directed to the "back side" of an opaque object so as to provide a view not visible to the user from the user's current position. In one embodiment, a virtual laser pointer beam may bend around the object to make clear this hidden point of view. For convenience, the term "laser pointer" is used herein to refer to a virtual laser pointer, which is a simulated beam projected through a (virtual) 3D scene.

The camera mode may have an additional mode to allow the capture of a 3D image in certain embodiments. For example, a second point of view may be specified from a slightly shifted position from a first point of view, allowing the generation of a 3D captured image. In other words, multiple camera locations may be used to capture 2D images that may be combined to render a 3D image. Said another way, the camera mode may support stereoscopic image capture within the 3D scene via capture of left and right images of the specified scene. The captured (stereoscopic) image may then be stored and/or displayed as desired, e.g., on a 3D display system, such as system 100.

In further embodiments, pressing a button on the user input device may "freeze" or "pause" an image. Then, continuing to hold down the button or pressing the button a second time may initiate capturing, or saving, of the image. Alternately holding down the button may cause the virtual laser pointer to extend from the user input device tip (in the rendered 3D scene).

Additionally, image filters may be associated with the camera mode. Filters may include red, green, or blue filters, among others. Additionally, an infra-red (IR) filter or an X-ray function may be associated with the camera mode. A wire frame or triangulated grid may also be visualized.

In certain embodiments, the virtual laser beam extending from a tip of the user input device may be used to designate a fixed spot on an object in the 3D scene. The user input device may then be moved, for example around the object, and images collected of that spot (on the object) from various perspectives. In other embodiments, a point of interest may be specified and the point of view of the camera may be automatically oriented before collection of the images.

In a further embodiment, an object moving through 3D virtual space may be designated, or tagged, and followed by the camera. In some embodiments, the camera mode may include image stabilization to improve the user's ability to follow the moving object. Additionally, the user input device may be used to define a path through the 3D virtual space. The camera may be programmed to follow along this path. In one mode, the camera may point along the direction of the path. In another mode, the direction of the camera with respect to the path may be selected by the user, e.g., the user may specify that the camera always face backwards, or sideways while moving along the path.

Further, the user input device may be used to position the camera point of view, and then may be decoupled from the camera, leaving the camera (with specified point of view) in place (stationary). In this manner, the user input device may be used to establish one or more instances of the camera (or multiple cameras) in the 3D scene, as desired. The positioned camera may take video (continuous images) or single images (snapshots) according to a user specified schedule. The camera may then be used to perform other tasks, including, for example, the positioning of one or more other cameras. In some embodiments, the camera may be programmed to track, or follow, or detect, a moving object. Thus, the positioned camera may take video (continuous images) or single images (snapshots) according to a user specified schedule, or may be triggered by motion of the object being tracked.

In yet another embodiment, the captured images and/or videos recorded by the camera may be made available, e.g., in real time or otherwise, to collaborators on other 2D and 3D display systems. For example, a teacher leading a class may capture images and/or videos and share with students in real time. The captured and recorded images and/or videos may be made available, or shared, via any of various types of networks, including, but not limited to, a local area network (LAN), a wide area network (WAN) such as the Internet, or a wireless personal area network (WPAN), among other types of networks.

Figure 6:
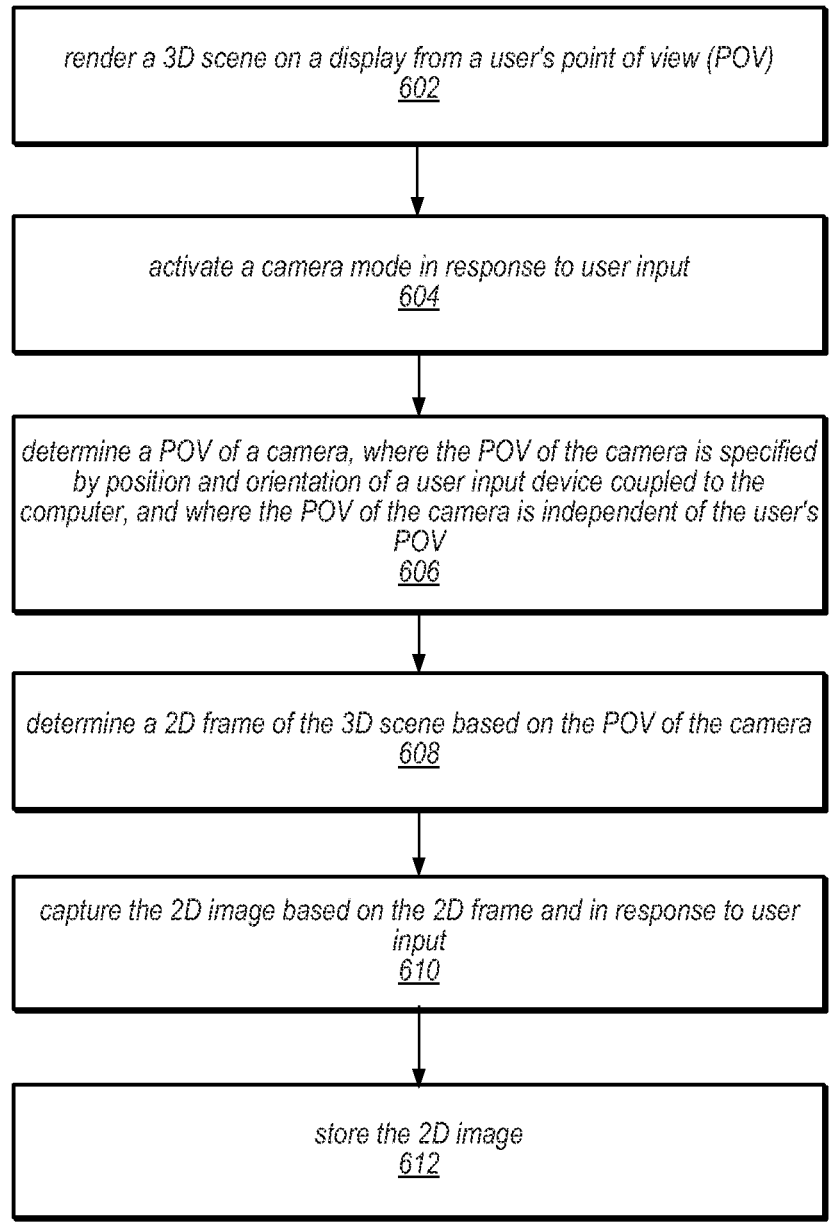
FIG. 6 is a block diagram illustrating a method according to embodiments of the invention.

FIG. 6—Block Diagram of a Method for Capturing Images

FIG. 6 illustrates an exemplary embodiment of a method for capturing an image of a portion of a three dimensional (3D) scene. The method shown in FIG. 6 may be used in conjunction with any of the systems or devices shown in the above Figures, among other devices. Further, the method shown may be performed by a computer or other processing device, such as a functional unit, and may be implemented as programming instructions, executable by a processor or functional unit, and stored on a memory medium. In various embodiments, some of the method elements shown may be performed concurrently, in a different order than shown, or may be omitted. Additional method elements may also be performed as desired. As shown, this method may operate as follows.

At 602, a 3D scene may be rendered on a display of a 3D stereoscopic system or some other form of 3D display system. The display may be incorporated (or included) in wearable headgear. The 3D scene may be rendered from a point of view (POV), e.g., a first perspective, or first POV. For example, the 3D scene may be rendered from a user's current POV. In other words, the first perspective, or first POV, may be a first perspective, or POV, of a user of the 3D display system.

At 604, a camera mode of the 3D display system may be activated. The activation of the camera mode may be in response to user input as described above in reference to FIGS. 4-5. Thus, for example, the camera mode may be activated when a user presses a button of a user input device. Alternatively, the camera mode may be activated via a menu or a keyboard command, among others.

At 606, a POV of a camera may be determined. It should be noted that the 3D scene may continue to be displayed from the first POV, thus, the POV of the camera may be considered a second POV that is separate and distinct, or in some instances, independent of, the first POV (of 602). In other words, the POV of the camera may be independent of the user's POV which is used to render the 3D scene. The POV of the camera may be specified by position and/or orientation of a user input device coupled to a computer of the 3D display system rendering the 3D scene. Thus, the POV of the camera may be specified by the location and orientation of a tip of a user input device, such as user input device 130. In some embodiments, the POV of the camera may be based on the position and/or orientation of the user input device, but where the POV of the camera may include an offset from the position and/or orientation of the user input device.

At 608, a two dimensional (2D) frame of the 3D scene may be determined based on the POV of the camera. In other words, a rendering of the 3D scene based on the POV of the camera may be determined or specified, but not displayed to the user.

At 610, a 2D image based on the 2D frame may be captured in response to user input. The user input may be a button click (or other activation means) on a user input device or may be a programmatic instruction initiated by the user. A sequence of 2D images may be captured in response to the user input. The sequence may be based on a fixed POV of the camera, or the POV of the camera may be dynamic, e.g., may track a path specified by a user. For example, the POV of the camera may be specified to trace the path of an object of interest. Alternatively, or additionally, the POV of the camera may trace a path defined by the user, such as around an object, or in order to create a 3D image from respective 2D images captured along the path.

At 612, the 2D image, or sequence of 2D images, may be stored. The images may be stored locally, or on a server on a network. The server may be coupled to the 3D stereoscopic system via a LAN or WAN. The images may be immediately available for viewing within the 3D environment or may be stored for later viewing outside of the 3D environment. The 3D display system may include program instructions to replay the scene from the POV of the camera.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for capturing a virtual two dimensional (2D) image of a portion of a virtual three dimensional (3D) scene, comprising:
   a computer performing:
      rendering a virtual 3D scene on a display from a user's point of view (POV);
      activating a camera mode in response to first user input via a user input device in communication with the computer, wherein the user input device comprises a stylus, wherein the camera mode enables the user input device to trigger the computer to capture virtual images within the virtual 3D scene based on a POV of the user input device;

determining the POV of the user input device, wherein the POV of the user input device is independent of the user's POV;

determining a virtual 2D frame of the virtual 3D scene based on the POV of the user input device;

capturing the virtual 2D image based on the virtual 2D frame and in response to second user input via the user input device; and storing the virtual 2D image.

2. A non-transitory computer readable memory medium storing programming instructions executable by a processor to:

render a virtual three dimensional (3D) scene on a display;

activate a camera mode in response to first user input via a user input device, wherein the user input device comprises a handheld pointing device, wherein the camera mode enables the user input device to trigger capture of virtual two dimensional (2D) images within the virtual 3D scene based on a point of view (POV) of the user input device;

determine the POV of the user input device based on a position and orientation of the user input device;

determine a virtual 2D frame on the display based on the POV of the user input device;

capture a virtual 2D image based on the virtual 2D frame and in response to second user input via the user input device; and store the virtual 2D image.

3. A system comprising:

at least one display;

at least one user input device comprising at least one accelerometer and at least one gyroscope; and a processor coupled to the at least one display and the at least one user input device, wherein the processor is configured to:

render a virtual three dimensional (3D) scene on the at least one display;

activate a camera mode in response to first user input, wherein the camera mode enables the at least one user input device to trigger capture of virtual two dimensional (2D) images within the virtual 3D scene based on a point of view (POV) of the at least one user input device;

determine the POV of the at least one user input device based on a position and orientation of the at least one user input device;

determine a 2D virtual frame on the display based on the POV of the at least one user input device;

capture a virtual 2D image based on the 2D virtual frame and in response to second user input via the user input device; and store the virtual 2D image.

4. The computer-implemented method of claim 1, wherein the first user input comprises a button click on the user input device.

5. The computer-implemented method of claim 1, wherein capturing the virtual 2D image comprises capturing a sequence of virtual 2D images; and wherein storing the virtual 2D image comprises storing the sequence of virtual 2D images.

6. The computer-implemented method of claim 5, wherein the POV of the user input device is an initial POV;

wherein capturing the sequence of virtual 2D images comprises dynamically changing the initial POV based on a user specified path, thereby generating a set of POVs based on the user specified path.

7. The computer-implemented method of claim 6, wherein the user specified path is based on a path of the user input device through the 3D scene.

8. The computer-implemented method of claim 6, wherein the user further specifies a direction of the set of POVs with respect to the user specified path.

9. The computer-implemented method of claim 6, wherein the user specified path comprises a path of an object of interest.

10. The computer-implemented method of claim 1, wherein capturing the virtual 2D image comprises capturing one or more virtual 2D images based on a user specified schedule.

11. The non-transitory computer readable memory medium of claim 2, wherein to capture the virtual 2D image, the program instructions are further executable to capture a sequence of virtual 2D images; and wherein to store the virtual 2D image, the program instructions are further executable to store the sequence of virtual 2D images.

12. The non-transitory computer readable memory medium of claim 11, wherein the POV of the user input device is an initial POV;

wherein to capture the sequence of virtual 2D images, the program instructions are further executable to dynamically change the initial POV based on a user specified path, thereby generating a set of POVs based on the user specified path.

13. The non-transitory computer readable memory medium of claim 12, wherein the user specified path is based on a path of the user input device through the 3D scene.

14. The non-transitory computer readable memory medium of claim 12, wherein the user further specifies a direction of the set of POVs with respect to the user specified path.

15. The non-transitory computer readable memory medium of claim 12, wherein the user specified path comprises a path of an object of interest.

16. The non-transitory computer readable memory medium of claim 2, wherein to capture the virtual 2D image, the program instructions are further executable to capture one or more virtual 2D images based on a user specified schedule.

17. The system of claim 3, wherein the POV of the user input device is an initial POV;

wherein to capture the sequence of virtual 2D images, the processor is further configured to dynamically change the initial POV based on a user specified path, thereby generating a set of POVs based on the user specified path.

18. The system of claim 17, wherein the user specified path is based on a path of the user input device through the 3D scene.

19. The system of claim 17, wherein the user specified path comprises a path of an object of interest.

20. The system of claim 3, wherein to capture the virtual 2D image, the processor is further configured to capture one or more virtual 2D images based on a user specified schedule.

\* \* \* \* \*